United States Patent [19]

Raboin

[11] Patent Number: 5,492,278

[45] Date of Patent: Feb. 20, 1996

[54] SINGLE MOTION MOBILE FLUORESCENT LAMP CRUSHER, CLEANER AND MATERIAL CLASSIFIER

[76] Inventor: James P. Raboin, 1521 7th St. N., Fargo, N. Dak. 58102

[21] Appl. No.: 115,649

[22] Filed: Nov. 9, 1993

[51] Int. Cl.$^6$ .......................... B02C 18/06; B02C 19/12; B02C 23/10

[52] U.S. Cl. .............. 241/57; 241/74; 241/79.1; 241/99; 241/152.2; 241/176; 241/188.1

[58] Field of Search .................. 241/57, 60, 99, 241/DIG. 14, 19, 24, 152.2, 188.1, 189.1, 187, 74, 176, 177, 79.1

[56] References Cited

U.S. PATENT DOCUMENTS

| | | | |
|---|---|---|---|
| 3,233,836 | 2/1966 | Merges | 241/60 |
| 3,862,719 | 1/1975 | Muller | 241/74 |
| 3,913,849 | 10/1975 | Atanasoff et al. | 241/55 |
| 3,946,953 | 3/1976 | Hato | 241/79.2 |
| 4,545,540 | 10/1985 | Nakamura | 241/99 |
| 4,655,404 | 4/1987 | Deklerow | 241/99 |
| 5,042,724 | 8/1991 | Perry | 241/19 |
| 5,092,527 | 3/1992 | Perry et al. | 241/19 |
| 5,375,774 | 12/1994 | Perry | 241/14 |
| 5,388,773 | 2/1995 | Perry | 241/19 |

*Primary Examiner*—Mark Rosenbaum
*Assistant Examiner*—John M. Husar

[57] ABSTRACT

A mobile fluorescent lamp digesting system which crushes, cleans and classifies various lamp components into distinct groups i.e. clean glass, phosphor powder and metal endcaps, utilizing a crusher fan mounted inside a screen drum which is mounted on single rotating axis. An air knife is directed into fractured material during processing further enhancing cleaning action. The system is operated under negative air pressure to collect any ambient phosphor dust and or mercury vapor via a two stage filtering arrangement. First stage filter media is resistant to plugging by fine dust. The second stage is activated carbon media to collect metallic mercury vapors. Classified components are neumatically transported into collection chambers or drums after processing is completed for easy handling.

6 Claims, 1 Drawing Sheet

SINGLE MOTION MOBILE FLUORESCENT LAMP CRUSHER, CLEANER AND MATERIAL CLASSIFIER

BACKGROUND OF THE INVENTION

1. Field of the Invention

The present invention relates to the crushing or digestion of used fluorescent lamps. More specifically, the present invention relates to a combined crushing system whereby the various components, combined in creating lamps, are crushed, cleaned and classified using one mechanical motion. Further cleaning is achieved with the addition of an air knife. Due to simplify, this invention can be made small enough to function easily as a portable or mobile unit. A deflate distinction is made between the separated components into clean glass, clean metal ends and mercury rich phosphor powder.

2. Discussion of the Prior Art

Fluorescent lamps have long been recognized as an efficient lighting source. They have been equally recognized as a difficult waste to dispose of due to the presence of metallic mercury and mercury vapor inside the lamps for operational purposes.

Due to the bulky, fragile nature of fluorescent lamps, it becomes readily evident that conventional crushing merely to reduce the volume, or partial seperation techniques after crushing do not sufficiently deal with costly and/or potentially hazardous problems of handling lamps during storage, transportation to a recycling facility and/or disposal or recycling options of the end waste streams generated by partial seperation techniques.

Following is a study of these issues . . . crushing, classification of lamp components during processing and mobile use of this technology relative to this industry:

U.S. Pat. No. 2,185,352 issued Jan. 2, 1940 to C. F. Peters discloses a foot operated hammer designed to impact a bottle in an inclined chute; thereby breaking it and permitting the fractured pieces to fall into a collection receptacle.

U.S. Pat. No. 2,558,255 issued Jun. 26, 1951 to N. E. Johnson et al. discloses a remote control motor driven glass fracturing apparatus.

U.S. Pat. No. 3,363,756 issued Nov. 21, 1967 to D. J. Morgenson discloses a horizontal high speed rotating hammer blade where bottles are dropped through chute and struck as much as 60 times for each second it remains in the contact zone.

U.S. Pat. No. 3,655,138 issued Apr. 11, 1972 to G. A. Luscombe discloses a plurality or ratating hammer blades where deflecting blades are arranged to enhance distribution of fractured glass after impact.

U.S. Pat. No. 3,889,886 issued Jun. 17, 1975 to J. D. Spivey discloses a waste bottle fractuing device where rate of entrance of bottles is regulated via baffles which slow down entrance speed. Multiple rotating arm blades, with baffles, prevent glass from being ejected upwardly out of the crusher.

U.S. Pat. No. 2,593,657 issued Apr. 22, 1952 to A. J. Coon et al. discloses a reciprocating crusher designed to crush fluorescent tubes. Coon attempts to contain free floating phosphor dust by venting it "to the outer atmosphere wherupon it is safely dispersed into space". Although Coon reduces the volume and trys to create safe operating conditions, his efforts are grossly inadequate and he does nothing in the way of filtering harmful emissions or classifying lamp components into distinct gruoups i.e. glass, ends and powder. Coon's process could be construed as mobile due to simplicity in design but would not meet current safety levels.

U.S. Pat. No. 2,620,988 issued Dec. 9, 1952 to E. H. Tellier discloses continuous flushing of water at the fracturing zone. Dust is kept from entering the air space however nothing is done to classify fractured material. In addition, he has introduced water which is now hazardous and the end result is worse than before processing.

U.S. Pat. No. 2,628,036 issued Feb. 10, 1953 to J. B. Hall discloses another fluorescent lamp disposal system where water is introduced to control hazardous components. Lamps are pained lengthwise down a tubular inlet; are progressively fractured into pieces by rotating hammers. Some attempt is made to classify out metal end caps for recycling by means of magnetic forces. This method is too cumbersome to be mobile and classification with water in the system is messy.

U.S. Pat. No. 2,866,604 issued Dec. 30, 1958 to J. B. Hall discloses a fluorescent lamp disposal device where rotary arms impacts lamp. Air drawn through lamp loading mechanism to attempt better vapor control. Arrangement bathed in water during breaking, U.S. Pat. No. 3,913,849 issued Oct. 21, 1975 to I. M. Atanasoff et al. discloses a fluorescent lamp digester or crusher. Mercury and other fluorescent materials, have not been separated sufficiently from the supporting and confining materials, i.e. glass to allow safe handling. His system is designed to mount on top a barrel with a downward draft drawn through a filter arrangement and out removing mercury vapor and phosphor powder. No real attempt to classify.

U.S. Pat. No. 5,092,527 issued Mar. 3, 1992 to T. J. Perry et al. discloses a digesting system for disposal and seperation of component materials using a series of countercurrent air streams. The system is operated under negative air pressure to control and capture hazardous vapors and dust. Lamps are inserted into a tubular opening where impact with a rotary blade and seperation begin. Perry's system is too bulky to be mobile and he does not classify component materials enough. Glass and metal ends are deposited in two of three cyclone chambers. The third chamber is a bag house for vapor and dust collection. Air speeds are high around 6,000 to 7,500 feet per second making vapor containment difficult. Crushing is seperate from seperation. All seperation is done via air flow in the cyclones. Seperated component materials are dropped down through the cyclones into a large holding tank No good classification for recycling options once process is completed.

Consequently, the need still exists for a method and means that is economical, convenient and effective in treating or digesting used lamps that crushes, deans and classifies materials but is small enough to be operated as an economical mobile system.

OBJECTS OF THE INVENTION

It is an object of the present invention, therefore, to provide an apparatus for treating used fluorescent tubes that effectively classifies mercury rich phosphor powder, clean glass particulate and clean metal end-caps into three seperate distinct classifications by a dry rotating drum screening method.

It is a further object of the invention to provide a method and means for treating used fluorescent lamps that could be made small enough to be considered mobile or portable and thereby enabling the invention to be taken from location to location thereby reducing the regulatory restrictions and fluorescent lamp handling costs currently incurred by all previous technologies.

It is a still further object of the invention to provide a method and means for crushing, cleaning and classifying fluorescent lamp material components all in a single motion.

It is a still further object of the invention to provide a method and means for faster, better cleaning action by the introduction of an air knife during processing.

It is a still further object of the invention to provide a method and means for cleaning crushed material components using a friction media during processing.

It is a still further object of the invention to provide a method and means for crushing fluorescent lamps and fiction media via a crusher fan which fractures and circulates fractured material back through crusher fan for added turbulance and cleaning action during processing.

It is a stir further object of the invention to provide a method and means for containing phosphor powders by a TEFLON coated filter media.

Other objects and advantages of the invention will become evident from reference to the accompanying drawings and description.

BRIEF DESCRIPTION OF THE INVENTION

It has been found by the present inventor that a very good crushing, cleaning and classification of material components utilized in construction of fluorescent lamps can be made for used lamps to facilitate recycling efforts by the process disclosed. Once the intact or previously fractured lamp is inserted into the device, it impacts the crusher fan which fractures and circulates fractured material through crusher fan continuously until replaced by the addition of new fluorescent lamp material through the feed tube entrance. The crusher fan is mounted deep inside a tumbler screen. As fractured material is drawn through crusher fan, it is being tumbled in the dram tumbler screen where any phosphor powders fall through into a powder collection hopper for exiting out of the process into sealed chamber. Bigger glass and metal end particulate remain inside tumbler screen and continue to act as friction media for any new fractured material. Tumbler screen is a two stage screen with smaller hole opennings at the bottom half of the screen drum and larger hole opennings at the top half of screen drum facilitating clean glass particulate seperation from tumbling process, for final exiting and collection outside process. Metal ends remain in tumbler screen due to their larger relative size and eventually exit tumbler screen through the mouth openning of the tumbler drum into its respective hopper for exiting outside the process into its final collection chamber. An air knife is added being directed at fractured material inside tumbler screen to further enhance powder seperation from fractured material during tumbling. Mercury rich powder and clean glass are air lifted into their respective collection chambers. The entire process is operated under negative air pressure insuring the mercury gas be drawn through charcoal filter arrangement where it is retained until saturated by the gas.

DESCRIPTION OF THE PREFERRED EMBODIMENTS

Figure 1:
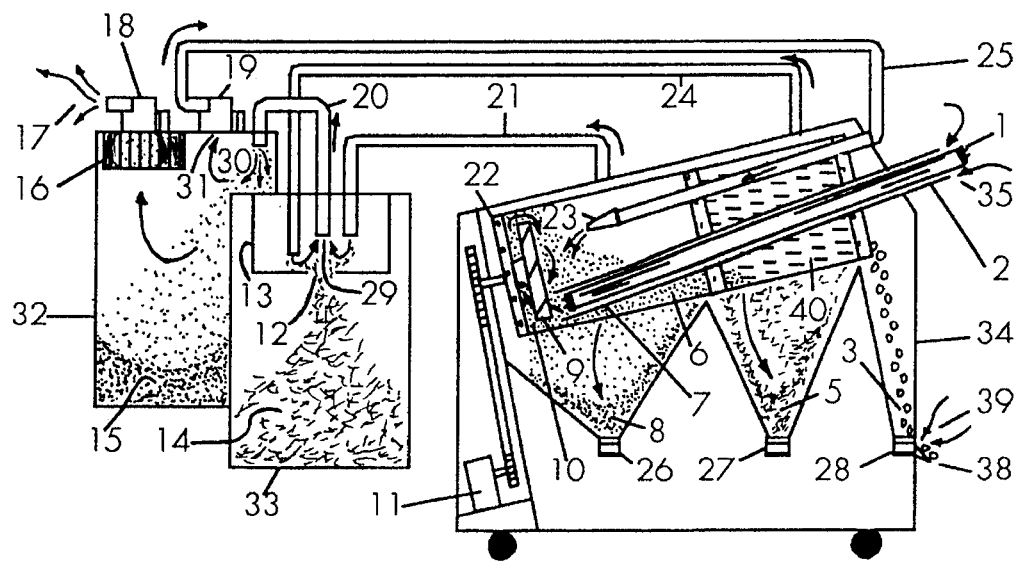
FIG. 1 is an overall partially broken away side view of the apparatus of the invention.

FIG. 1 shows diagrammatically a side elevation of a partially broken away depiction of the fluorescent lamp treatment apparatus of the invention in which the entire apparatus 32, 33 and 34 are coordinated to provide a very superior crushing, cleaning and classification of the basic lamp material components. An initial feed tube is provided 2 with a fracturing and first stage cleaning device or means, hereinafter called a rotating crusher fan 9, is fixed to drum base plate 22 and mounted inside a screen drum 40 device or means; the screen drum 40 is fixed to an axle 42 FIG. 3 and powered by a motor 11 FIG. 1. The rotating crusher fan is positioned to strike the end of a fluorescent lamp 1 that is extended or passed progressively down the feed tube 2. The feed tube 2 is shown shorter than the fluorescent lamp to better show the fluorescent lamp 1. However, it is desirable for the feed tube 2 to be longer than the fluorescent lamp so that, if the lamp implodes when impacting crusher fan 9, any toxic gas or flying glass will be contained within the feed tube and sucked into apparatus rather than escape into the environment. Negative air pressure is drawn inward from outside feed tube 35 as outside air passes between the lamp as the lamp passes down the feed tube.

Figure 2:
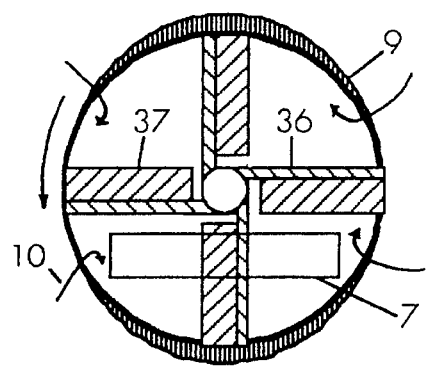
FIG. 2 is an enlarged broken away front view of the crusher fan and feed tube entrance relative to the crusher

The rotating crusher fan 9 is preferably rotated, as shown in FIG. 2, counterclockwise so that the lamp is struck downwardly against scissor edge of the feed tube 7, progressively fracturing off small pieces of the lamp which at the same time are drawn through the crusher fan 9 and forced upward in a circular fashion and recirculated back through the crusher fan 9 to be broken into still smaller pieces. A minimum of one blade to a mazimum of 16 blades can be used on the crusher fan 9 as shown in FIG. 2 where leading edge 36 of fan blade is sharpened to an edge that closely resembles a scissor edge where the trailing edge 37 is such that fractured material impacting the leading edge is pushed past trailing edge creating a flow of fractured material through crusher fan 9 up through friction media 10. A side view of the crusher fan 9 as seen in FIG. 3 illustrates the relationship between leading edge 36 and trailing edge 37.

In addition, the rotating screen tumbler drum 40 as seen in FIG. 1 is rotating a minimum of 40 revolutions per minute (rpms) to a maximum of 70 rpms thereby forcing the stream of fractured material 10 which, in this case acts as friction media, continues recirculating through crusher fan 9 and intersects a stream of tumbling fractured material 6 further facilitating cleaning of fractured material 6 before exiting rotating screen tumbler dram 40. The impact of both streams intersecting each other causes the toxic dust particulates coating the inside of the fluorescent lamp to be blasted loose from inside surface of fractured glass. Small dust particulates, after jarring loose, become entrained in air stream within the apparatus 34. Air stream or flow which initially passes down feed tube alongside fluorescent lamp 35 into tumbling chamber 40 and progresses through powder hopper 26 and glass hopper 27. Both hoppers serve as exhaust for apparatus 34. A vacuum or suction is applied to exhaust tubes 26 and 27 from a suction or draft device at the end of entire apparatus 32 in this case through two suction devices 18 and 19 with a minimum air flow rate of 100 cubic feet per minute (cfm) and a minimum of 100 inches of water lift each up to a maximum air flow rate of 175 cfm and 100 inches of water lift each. Minimum combined suction of 200 cfm; maximum combined suction of 350 cfm.

Figure 3:
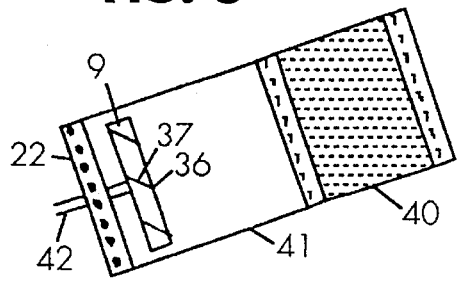
FIG. 3 is a broken away side view of crusher fan inside drum tumbler screen where crushing, cleaning and classifying actually takes place.
Figure 4:
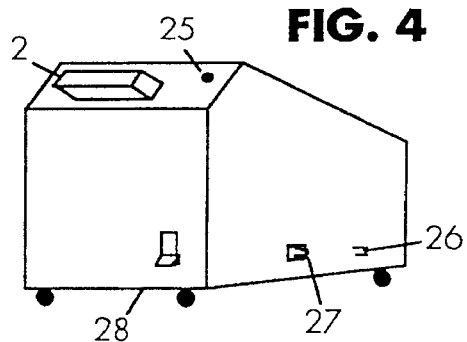
FIG. 4 is an overall reduced view of the main apparatus of the invention to show entrances and exits to the main processing chamber.

Below rotating tumbler screen 40 as seen in FIG. 1 two hoppers 26 and 27 are positioned. 26 collects free dust and mercury rich phosphor powder 8 as rotating screen 41 as depicted in FIG. 3 sifts out fine particulate through 1/16 inch to 1/8 inch openings where gravity forces powder 8 downward to exhaust opening FIG. 4 opening 26. A hose 21 fixes to powder hopper exit tube 26 FIG. 1 and FIG. 4 and is air lifted into glass exchange chamber 13 as seen in FIG. 1 where powder and small glass particulate entering chamber are further refined or seperated due primarily to a 90 degree turn in gas direction created by suction device mounted to powder collection chamber 32 where suction is drawn through three inch hose 20 where distance between hose 21 entrance into glass exchange chamber 13 is located 2 3/8 inches from powder exit openning 29. Refined powder travels inside hose 20 through powder suction chamber entrance 30 of powder suction chamber 32 to final resting place 15 at bottom of powder collection chamber. Glass particulate, after seperation with powder particulate, upon entering glass exchange chamber 13, is exited through glass collection chamber entrance 12 where a minimum openning of three inches to a maximum openning of 7 5/8 diameter hole size, depending on air flow, is needed. The diameter in any case of glass exchange chamber 13 is eight inches. Any cleaned and classified glass exiting tumbler screen 40 travels through hose 24 into glass exchange chamber 13 exiting chamber through entrance 12 to clean glass collection point 14. Any ambient dust being drawn through hose 24 is seperated in glass exchange chamber 13 and drawn through glass exchange chamber exit 29 through hose 20 with entrance into powder collection chamber 212. Upon entrance of ambient fine dust into powder collection chamber, suction device 18 draws mercury rich vapor and phosphor dust gas through 0.3 micron openning TEFLON coated first stage filter media 16 where mercury vapor and other gases penetrate, but dust particulate gather on TEFLON coated first stage filter 16 and slide off said filter media after sufficient mass of dust accumulates due to gravity and viberation. Hence this first stage filter media resists plugging and lasts up to five times longer than none TEFLON coated filter media. The mercury vapor and other gases are immediately drawn through the second stage filter, in this case located inside first stage filter media 16 and are collected in two to five pounds of iodine activated carbon which adsorbes up to 18% of its weight in mercury vapor before dean gases are exited outside process 17. Any free floating fine dust that has not yet settled in powder collection chamber 32 is drawn through powder chamber exit 31 due to suction device 19 and blown along with other gases and mercury vapor through hose 25. Hose 25 connects to air knife 23 where three 1/2 inch holes and two 1/4 inch holes are aimed at tumbling media 6 aiding in speed of powder seperation from fractured media.

The openning size of 28 and 2 are such that negative pressure is created at both opennings 39 and 35 even with the introduction of an air knife 23. Metal end-caps located in fractured material 6 as seen in FIG. 1 continue to fill tumbler screen 40 until exiting mouth of tumbler screen 3 into metal end-cap hopper 28 and exiting out the process at 38.

It should be understood that although the present invention has been described at some length and in considerable detail and with some particularity with regard to several embodiments in connection with the accompanying figures and description, all such description and showing is to be considered as illustrative only and the invention is not intended to be narrowly interpreted in connection therewith or limited to any such particulars or embodiments, but should be interpreted broadly within the scope of the delineation of the invention set forth in the accompanying claims thereby to effectively encompass the intended scope of the invention.

I claim:

1. A mobile fluorescent lamp digester system where lamps are crushed, cleaned of any powder residue and where material components used to construct the lamps are classified into three distinct groupings during processing: clean glass, mercury rich phosphor powder and metal end-caps; where specified operations are performed at an angle to the horizon on a single rotating axis comprising:

(a) a rotating crusher fan mounted on one side of a plate where the single rotating axis is joined to the center of the plate and where a plurality of crusher fan blades equally spaced are arranged and constructed at angle of pitch where a leading edge impacts incoming lamps and where trailing edge forces fractured material through the crusher fan continuously recirculating fractured material up and around through friction media thereby enhancing cleaning of fractured material due to an increase in turbulance and friction caused specifically by recirculation;

(b) a rotating tumbler screen drum member affixed to an outside edge of the plate parallel to the axis extending over the crusher fan where the crusher fan is mounted inside the screen drum where the screen drum is perforated with small openings near the crusher fan having progressively larger opennings toward a mouth of the screen drum mouth where fractured material enters at one end and sifts out, through perforated openings via rotating action and gravitational forces, into distinct classifications;

(c) said friction media located inside the screen dram where the drum angle is such that friction media remains at the dram bottom surrounding the crusher fan; where the friction media is comprised of varying type, size and mass density of particles for purposes of cleaning fractured material via frictional forces during rotation of the drum.

2. A digester system in accordance with claim 1 constructed to be portable or mobile mounted on wheels, able to be transported from location to location as a generator operated or mobile unit.

3. A digester system in accordance with claim 1 constructed to classify processed lamps into distinct material groups such as clean glass, phosphor powder and metal end-caps, by using said rotating screen arrangement.

4. A digester system in accordance with claim 1 constructed such that an air knife has blown through at varying velocities and pressures via a blower device where a nozzle is mounted on a tube end and is able to direct and control gas departure from said air knife, where same is directed into fractured material at a fracturing point for faster and more effective separation of phosphor powder and/or dust from fractured material.

5. A digester system in accordance with claim 1 constructed with a two stage filter apparatus where a first stage filter media is coated with TEFLON or other slippery material enabling said first stage filter media the ability to resist filter plugging by dust particulate being drawn by a suction device mounted behind filter arrangement; where a second stage filter media is arranged and constructed with iodine impregnated carbon granuals of varying sizes for adsorption of mercury vapors from gases being drawn through said first and second stage filters.

6. A digester system in accordance with claim 5 constructed to pneumatically transport classified materials exiting from each collection hopper located directly under the screen dram through hoses having varying gas velocities and pressures passing through a suction device, whereas hoses being attached at one end to each bottom of the collection hoppers and at the other end to a top of final collection chambers, said collection chambers each having an inlet and outlet at the top where gas at the outlet is drawn through said two stage filter apparatus by a suction device whereby classified material is released from air stream as same enters larger volume collection chambers relative to hoses for final depositing.

* * * * *